US010971959B2

(12) United States Patent
Mihaila et al.

(10) Patent No.: US 10,971,959 B2
(45) Date of Patent: Apr. 6, 2021

(54) STATOR FOR AN AXIAL FLUX MACHINE WITH A STATOR RING COMPOSED OF MODULES

(71) Applicant: WHYLOT SAS, Cambes (FR)

(72) Inventors: Vasile Mihaila, Figeac (FR); Serghei Savin, Capdenac Gare (FR); Huguette Tiegna, Figeac (FR); Vincent Ploix, Figeac (FR); Romain Ravaud, Labastide Murat (FR)

(73) Assignee: WHYLOT SAS, Cambes (FR)

( * ) Notice: Subject to any disclaimer, the term of this patent is extended or adjusted under 35 U.S.C. 154(b) by 343 days.

(21) Appl. No.: 16/066,867

(22) PCT Filed: Jan. 6, 2017

(86) PCT No.: PCT/FR2017/000007
§ 371 (c)(1),
(2) Date: Jun. 28, 2018

(87) PCT Pub. No.: WO2017/121941
PCT Pub. Date: Jul. 20, 2017

(65) Prior Publication Data
US 2019/0013707 A1      Jan. 10, 2019

(30) Foreign Application Priority Data

Jan. 14, 2016   (FR) .................................. FR1600078

(51) Int. Cl.
*H02K 1/18* (2006.01)
*H02K 1/14* (2006.01)
(Continued)

(52) U.S. Cl.
CPC ............. *H02K 1/182* (2013.01); *H02K 1/148* (2013.01); *H02K 1/2793* (2013.01); *H02K 21/24* (2013.01); *H02K 2213/12* (2013.01)

(58) Field of Classification Search
CPC ........... H02K 1/10; H02K 1/04; H02K 1/165; H02K 1/16; H02K 1/182; H02K 1/28;
(Continued)

(56) References Cited

U.S. PATENT DOCUMENTS

| 2010/0275660 | A1 | 11/2010 | Yoon et al. |
| 2011/0316381 | A1 | 12/2011 | Ksano et al. |
| 2014/0062249 | A1* | 3/2014 | Nagao .................... H02K 3/345 |
| | | | 310/215 |

FOREIGN PATENT DOCUMENTS

| EP | 1624555 | 2/2006 |
| WO | WO2015114794 | 8/2015 |

OTHER PUBLICATIONS

International Search Report dated May 11, 2017 from International Application No. PCT/FR2017/000007.
(Continued)

*Primary Examiner* — Bryan R Perez
(74) *Attorney, Agent, or Firm* — Crockett & Crockett, PC; K. David Crockett, Esq.

(57) ABSTRACT

This invention relates to a stator for an axial flux electromagnetic machine, with the stator forming a ring (1) having two substantially circular faces (1a, 1b) connected by a thickness comprising windings (3) regularly distributed in the ring (1). Each winding (3) is carried by a unit portion (4) having a core (5) around which the winding (3) is wound. The unit portions (4) are arranged concentrically edge-to-edge with respect to one another and have securing means (12, 12a, 14) with a support member (6) which is part or not of a casing housing the ring (1) carried either by axial and lateral faces of each unit portion (4) edge-to-edge or by at least one upper or lower face of with each unit portion being part of a substantially circular face.

15 Claims, 6 Drawing Sheets

(51) Int. Cl.
*H02K 1/27* (2006.01)
*H02K 21/24* (2006.01)

(58) Field of Classification Search
CPC .................. H02K 1/24; H02K 1/2793; H02K 1/145–148; H02K 1/18; H02K 3/487; H02K 3/28; H02K 21/12; H02K 3/38; H02K 3/18; H02K 3/345

See application file for complete search history.

(56) References Cited

OTHER PUBLICATIONS

Written Opinion of the International Searching Authority dated May 23, 2017 from International Application No. PCT/FR2017/000007.

* cited by examiner

STATOR FOR AN AXIAL FLUX MACHINE WITH A STATOR RING COMPOSED OF MODULES

FIELD

This invention relates to a stator for an axial flux electromagnetic machine with the unit portions forming a ring of the stator. The invention also relates to an axial flux electromagnetic machine and a method for mounting such a stator.

BACKGROUND

An electromagnetic machine comprises at least one stator and at least one rotor, an air gap separating these two elements. The rotor carries at least one permanent magnet, advantageously a series of permanent magnets, while at least one series of winding elements is carried by the stator.

Conventionally, each one of the winding elements comprises a core or a tooth carrying a coil, with the core being surrounded on each one of its sides by a notch, with a good electrically-conductive metal wire wound around the core in order to form the coil.

When the series of windings are electrically powered, the rotor which is secured to the output shaft of the engine is subjected to a torque resulting from the magnetic field, with the magnetic flux created being an axial flux for an axial flux electric machine.

Demand for electrical machines that can deliver a high power while retaining reduced weight and dimensions is currently very high.

In addition, in industrial applications, the reduction in the weight and in the dimensions of the engine for optimum output, the reduction in the detent torque and in the variation of total torque are criteria that are as important as the facility of production, mass production and the gain in manufacturing time.

Document EP-A2-1624555 which represents the closest prior art, describes a stator intended for an axial flux electromagnetic machine, with the stator forming a ring having two substantially circular opposite faces, with the stator being comprised of several unit portions defining the two substantially circular opposite faces, each unit portion having a core around which is wound the winding, the unit portions forming at least partially the ring being arranged concentrically with respect to one another.

The support member has notches each surrounding a portion of the periphery of a unit portion. The notches are separated by a wall. It follows that the unit portions cannot be placed edge-to-edge and that there is still an interval between them. This does not make it possible to obtain a compact stator.

Document US-A-2010/275260 describes a stator with windings each forming a unit portion. The unit portions have on their upper face a means of securing with a support member. The windings are fastened to seats which separate them and prevent them from coming together. These seats also have the disadvantage of increasing the price of the stator by the presence of auxiliary parts as well as the weight of the stator.

The problem at the base of this invention is to design a stator for an axial flux electromagnetic machine that is simple to mount by being easily adaptable while still allowing the stator to retain a compact shape by retaining a reduced distance between the windings.

SUMMARY

To this effect, according to the invention a stator is provided intended for an axial flux electromagnetic machine, with the stator forming a ring that has two substantially circular faces, with the stator being comprised of several unit portions defining the two substantially circular opposite faces, each unit portion having a core around which is wound the winding, the unit portions forming at least partially the ring being arranged concentrically with respect to one another, characterised in that the unit portions continuously define the two substantially circular opposite faces by being arranged concentrically edge to edge with respect to one another and each have securing means, with a support member which is part or not of a casing housing the ring, carried by axial and lateral faces of each unit portion edge to edge with an adjacent unit portion, or securing means with said support member carried by at least one upper or lower face of each unit portion being part of a substantially circular face.

The faces are said to be substantially circular because these faces can carry securing means that can protrude axially by retaining most of the flat and circular face, with the securing means occupying only a limited place on the circular face that is associated with it.

When the unit portions are placed end-to-end, this means that the unit portions are arranged adjacent while still forming a configuration in the shape of a ring, with the adjacent edges of the unit portions extending radially. There remains between the lateral portions that protrude outwards the most from adjacent unit portions a clearance that is sufficient for the assembly. Space is therefore saved in relation to the closest prior art for which the unit portions are separated from one another. The stator carried out as such is compact, has reduced dimensions and weighs less.

The technical effect obtained is simplicity in mounting. The unit portions can be manufactured far before the mounting in the stator on another mounting station and can be easily mounted individually in the stator. When a winding is deficient, its associated unit portion can also be removed easily from the stator in particular when each unit portion is removably secured in the stator. It is no longer necessary to wind the windings on a core that is already positioned on the stator, which procures more space for the coiling of the winding on a unit portion separated from the others than around a core that is already positioned on the stator.

The technical effect is also a substantial adaptability of the stator. It is for example possible to change the series of windings of the ring with another series of windings without having to unwind windings but by replacing the unit portions of the ring of the stator with the unit portions that carry another type of winding. These unit portions can be of a different size, only the securing means remain the same.

The stator according to this invention can therefore include unit portions that are made in series independently of the ring and comprising securing means that make it possible to improve the industrialisation process of the mounting of the stator which makes it possible to reduce the time and the cost of production.

Advantageously, each unit portion has a body or a tooth formed by an assembly of cores placed against one another radially to the ring. This characteristic is very advantageous given that it makes it possible to manufacture each unit portion in a simple way.

Advantageously, the support member is an integral part of the casing or is an added part secured to the casing. Such an assembly is therefore more resistant with elements that are secured to one another and connected to the casing or as a single piece with the casing.

Advantageously, between two cores of adjacent unit portions subsists a free space forming a notch and, where applicable, an isthmus formed by the edges located on the side intended to form an air gap on a first circular face of the ring, the edges of each unit portion of a second face of the ring opposite the first circular face, a first laterally protruding form being between the edges of the first and second faces of each lateral side of a unit portion, with the adjacent unit portions being arranged edge to edge at least by their first laterally protruding shapes.

This notch makes it possible to slightly separate the windings from one another. The first laterally protruding forms of two unit portions establish a contact between these two unit portions and assist in the positioning of the unit portions against one another. This first protruding form can be part of lateral securing means of the unit portions individually with respect to the casing of the stator, as shall be specified later.

Advantageously, the securing means are removable or permanent, with the removable securing means being carried out by screwing or snap-fitting elements between the adjacent unit portions and the permanent securing means being carried out by welding, gluing, or by elements of the rivet type. The removable securing means will be preferred when the unit portions are likely to be dismounted frequently.

Advantageously, the removable securing means are carried out by screwing, connection or snap-fitting elements on the edges of the adjacent unit portions of the facing second face and arranged edge-to-edge of the adjacent unit portions. As such, the unit portions placed edge-to-edge form at least one continuous circular face of the ring of the stator.

Advantageously, the permanent securing means are carried out by welding, gluing or riveting the facing edges and arranged edge-to-edge by the edges of the adjacent unit portions of the second face and the support member. This makes it possible to directly secure the unit portions together and prevent using an additional support member, which represents savings in means and a reduction in the weight of the stator.

Advantageously, the support member has holes radial to the ring and positioned by extending parallel to the edges of the adjacent unit portions.

Advantageously, the support member has forms of complementary securing associated with forms of the adjacent unit portions carrying out the securing means carried by each unit portion.

Advantageously, the forms of securing carried by the support member are insertion pawls, each insertion pawl having a constant or variable prismatic shape over the length of the pawl, an apex of a triangular section of the prismatic shape pointing to the support member and each one of the two other apexes with a triangular section of the prismatic shape being housed in a groove of a second respective axially protruding form carried by an edge facing each one of the two adjacent unit portions, with the first laterally protruding form and the second axially protruding form surrounding the insertion pawl between them.

This allows for an axial maintaining of the unit portions as well as a facility for positioning the unit portions by sliding along the pawl. The prismatic shape offers a substantial support surface of the insertion pawl for two adjacent unit portions. A shape other than prismatic can also be considered such as for example a half-cylinder shape.

Advantageously, the forms of securing carried by the support member are holes radial to the ring passing through the support member by forming mortises, facing the support member of the adjacent unit portions having a tenon penetrating into a respective mortise in the mounted position of the adjacent unit portions on the ring, with the tenon occupying only a minor portion of an upper or lower face of each unit portion.

A minor portion means that the largest portion of the upper and lower face is free of any tenon. This differentiates a tenon according to this invention from the connection according to the state of the art where it was the entire surface of the upper or lower face that formed a tenon. A tenon and mortise connection procures a simple and effective blocking of the unit portions with respect to the support member. The occupation of a minor portion of the face by the tenon means that the major portion of the upper or lower face of each unit portion does not penetrate into the mortise. This makes it possible to place the unit portions edge-to-edge in a circular configuration.

Advantageously, each tenon and the associated mortise are welded together. This reinforces this method of securing.

Advantageously, when a cylinder ring forming the edge of the ring is present, an outer ring surrounds the cylinder head of the ring over its entire periphery.

There cannot be any radial movement of the unit portions of winding other than the ring outside of the ring. The outer ring provides via interference-fit the mechanical resistance of the unit portions in the ring.

Advantageously, the cores of the unit portions are carried out with magnetic cores, sintered magnetic materials or any other magnetic or antimagnetic material.

Advantageously, the unit portions have variable shapes and dimensions for the same ring. The fact in particular that the securing means on the upper or lower faces of the unit portion do not occupy all of this face, makes it possible to adapt different shapes and dimensions of unit portions to the same support member, with the securing means remaining the same for different unit portions and able to be adapted for example in similar mortises. More mortises than unit portions can be provided in order to have a freedom for adapting different unit portions on the stator.

The coiling of the winding on each unit portion is done without a space limit given that the unit portions are not adjacent to one another during this coiling which represents a facility for mounting that is impossible to obtain for a ring that is already mounted in the stator for which the space left available between two winding elements is highly reduced.

The invention also relates to an electromagnetic machine that has at least one stator having a series of windings and at least one rotor carrying at least one magnet, characterised in that said at least one stator is a stator such as described hereinabove. This machine can have various forms such as an engine, generator or electromagnetic actuator.

BRIEF DESCRIPTION

Other characteristics, purposes and advantages of this invention shall appear when reading the following detailed description and with regards to the accompanying drawings provided as non-limiting examples and wherein.

DETAILED DESCRIPTION

The figures are provided by way of examples and do not limit the invention. They form diagrammatical block representations intended to facilitate the comprehension of the invention and are not necessarily to scale of the practical applications. In particular, the dimensions of the various parts do not represent reality.

In what follows, reference is made to all of the figures taken as a combination. When reference is made to one or more specific figures, these figures are to be taken in combination with the other figures for the recognition of the designated numerical references.

To simplify, when in one figure there are several elements of the same type such as for example of the unit portions, mortises and tenons, notches, etc., reference is made to only a single element per type in order to simplify and increase the clarity of the figures.

In reference to all of the figures, this invention relates to a stator intended for an axial flux electromagnetic machine. The stator forming a ring 1 having two substantially circular opposite faces 1a, 1b. These substantially circular opposite faces 1a, 1b are connected by a thickness or edge of the ring 1, able to form a cylinder head 15. The circular face 1a of the ring 1 can be the face of the facing ring of the rotor therefore forming a portion of the air gap of the electric machine comprising the stator.

The ring 1 has an inner cavity 2 delimited by an inner periphery while the edge of the ring can be delimited by the cylinder head 15 at the outer periphery of the ring 1.

The stator comprises windings 3 that are regularly distributed in the ring 1. According to the invention, each unit portion 4 has a core 5 around which a winding 3 is wound, the unit portions 4 forming at least partially the ring 1 being arranged concentrically with respect to one another and placed edge-to-edge. Edge-to-edge means that, between the lateral edges that protrude the most outwards of two adjacent unit portions 4, for example the edges referenced as 4b or 4a or the first laterally protruding forms 14 in the figures, there is a clearance that is just sufficient for the assembly of the unit portions 4.

Figure 1:
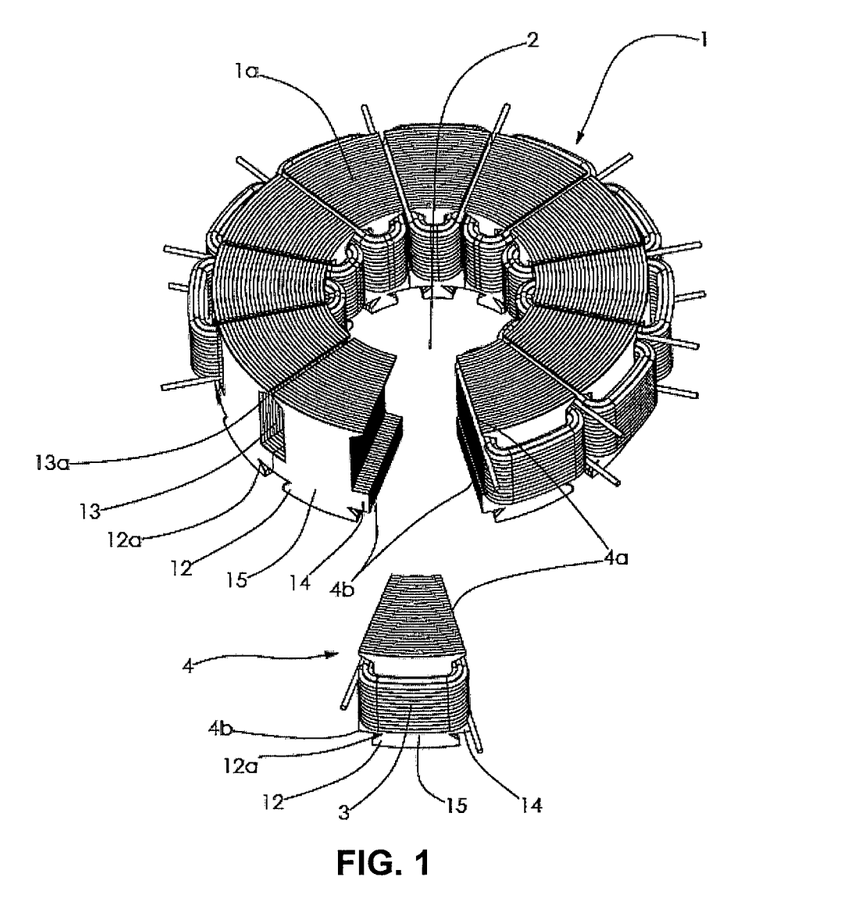
FIG. 1 diagrammatically shows a perspective view of a first embodiment according to this invention of a ring of a stator comprising unit portions each carrying a winding, a support member provided with securing means with each unit portion, the windings and the winding notches between the unit portions able to be seen in this figure, FIG. 2 diagrammatically shows a perspective view of the first embodiment according to this invention shown in FIG. 1, the support member provided with pawls being shown in this FIG. 2, with some windings having been removed from this figure, FIG. 3 diagrammatically shows a perspective view of a second embodiment according to this invention of a ring of a stator comprising unit portions, the adjacent unit portions being secured together in this second embodiment, with the windings being shown in this FIG. 3, FIG. 4 diagrammatically shows a perspective view of the second embodiment according to this invention shown in FIG. 3, with the windings not shown and the winding notches between the unit portions able to be seen in this FIG. 4, FIG. 5 diagrammatically shows a perspective view of a third embodiment according to this invention of a ring of a stator comprising unit portions, the adjacent unit portions being secured together in this embodiment by the intermediary of a support member that has holes in this third embodiment, FIG. 6 diagrammatically shows a perspective view of a fourth embodiment according to this invention of a ring of a stator comprising unit portions, the adjacent unit portions being secured together in this embodiment by the intermediary of a support member having forms of securing that cooperate with complementary forms provided on each unit portion.
Figure 2:
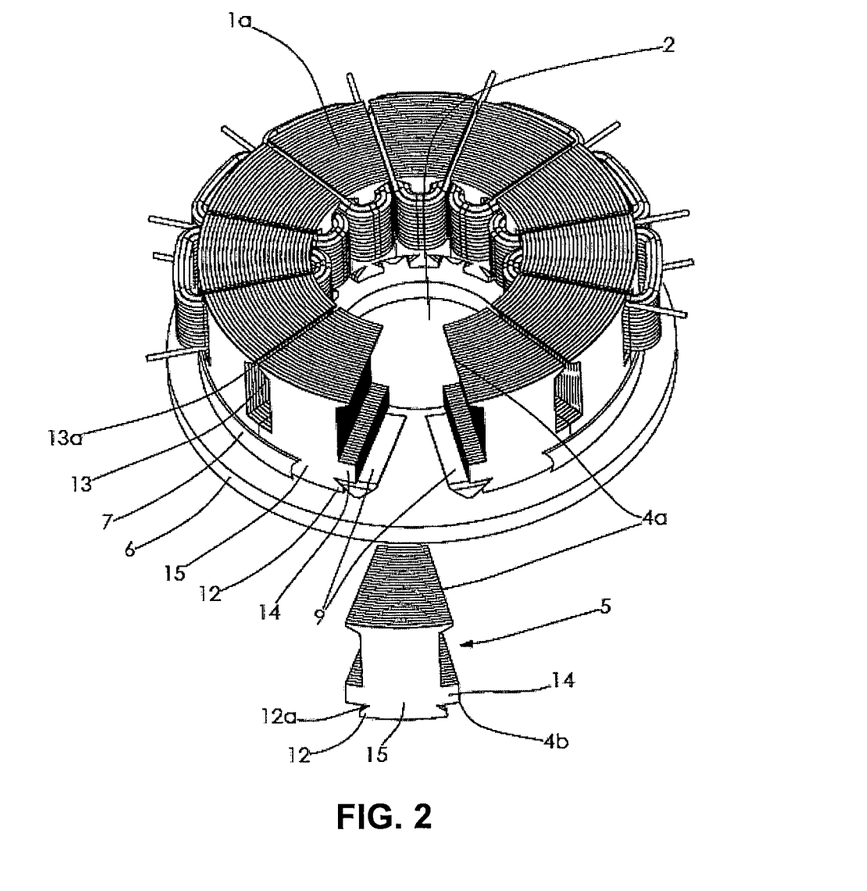
Figure 6:
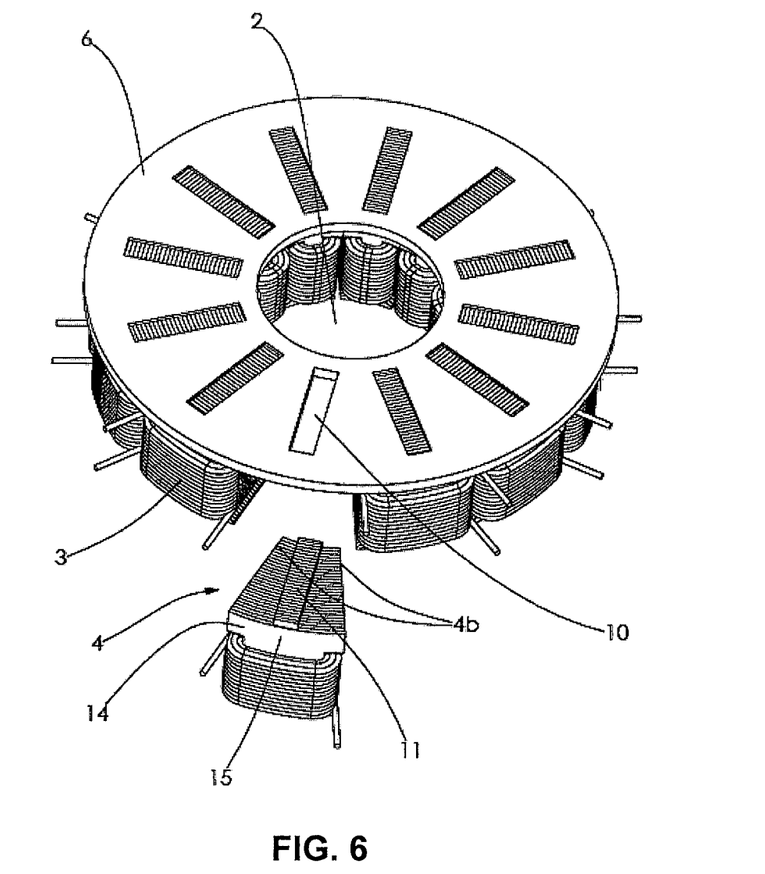

A unit portion 4 of a winding is shown at a distance from the ring 1 of the stator in FIGS. 1, 2 and 6.

All of the unit portions 4 of windings forming at least partially the ring 1 of the stator with the unit portions 4 arranged adjacent to one another concentrically at the centre of the ring 1.

The unit portions 4 have upper and lower faces that respectively form the upper face and the lower face of the ring 1 of the stator. The unit portions 4 each have means of securing 11 with a support member 6 which is part or not of a casing housing the ring 1, by at least one upper or lower face of each unit portion 4 being part of a substantially circular face 1a, 1b and/or securing means 12, 12a, 14 with the casing carried by axial and lateral faces of each unit portion 4 edge to edge with an adjacent unit portion.

The two types of securing means 11, 12, 12a, 14 described hereinabove can as such be used in combination or as an alternative. When the securing means 11, 12, 12a, 14 are used in combination, the securing is stronger and the problem of maintaining the unit portions 4 on the stator is resolved.

The basic windings 3 carried by the unit portions 4 after assembly by forming the ring of the stator can be interconnected in order to form coilings.

The unit portions 4 forming the ring 1 of the stator can be carried out with magnetic cores or with a base of magnetic or antimagnetic materials.

Each unit portion 4 can as such have a body or tooth formed by an assembly of cores placed against one another radially to the crown 1. This can be done via different cores or via a core or cores that are folded or wound several times around itself. The portions of core created as such form concentric arcs of a circle. This can be seen particularly well in FIGS. 1 to 4. Another arrangement of the cores can however be implemented.

A casing, not shown in the figures can house the ring 1. In this case, the support member 6, if the latter is present, can be a part of the casing or the support member 6 can be an added part secured to the casing, of the same material or of a different material with respect to the casing.

Between two cores 5 of adjacent unit portions 4 subsists a free space forming a notch 13 and, where applicable, an isthmus 13a formed by the edges 4a located on the side intended to form an air gap on a first circular face 1a of the ring 1.

A first laterally protruding form 14 can be included between the edges 4a, 4b of the first and second faces, this on each lateral side of a unit portion 4. The adjacent unit portions 4 are then arranged edge-to-edge at least by their first laterally protruding shapes 14 that abut. It is the face 1b of the ring 1 intended to be opposite the air gap that can carry a support member 6.

The first laterally protruding forms 14 of two adjacent unit portions 4 can delimit with the end portions close to the edges 4b of the unit portions a space for receiving a securing element carried by a support member 6, advantageously a pawl 9.

The securing means 11, 12, 12a, 14 can be removable or permanent. In the first case, the removable securing means 11, 12, 12a, 14 can be carried out by screwing elements, connecting or snap-fitting elements between adjacent unit portions 4. For example, the removable securing means can be carried out by screwing, connection or snap-fitting elements on the edges 4b facing the adjacent unit portions 4.

In the second case, the permanent securing means 11, 12, 12a, 14 can be carried out by welding, gluing or by elements of the rivet type. For example, the permanent securing means 11, 12, 12a, 14 can be carried out by welding, gluing or riveting facing edges 4b of the adjacent unit portions 4. The welding or gluing can be done by spots or beads.

For example, the adjacent unit portions 4 can be welded on internal and external peripheries of the ring 1 so as to improve the mechanical resistance, this as an alternative or as a complement to the removable securing means, with the inner periphery delimiting the inner cavity 2 of the ring 1.

The dimensions of a support member 6 can be adapted to those of the associated circular face 1b. For example, the support member 6 can have a circular configuration, in particular in the shape of a disc, by having a diameter that is slightly larger than the ring 1 and being concentric to the ring 1.

The support member 6 can have passages 8 in the ring 1 and positioned by extending parallel to the edges 4b of the adjacent unit portions 4.

The support member 6 can have addition securing means 9, 10 associated with the securing means 11, 12, 12a, 14 carried by the unit portions 4.

Figure 5:
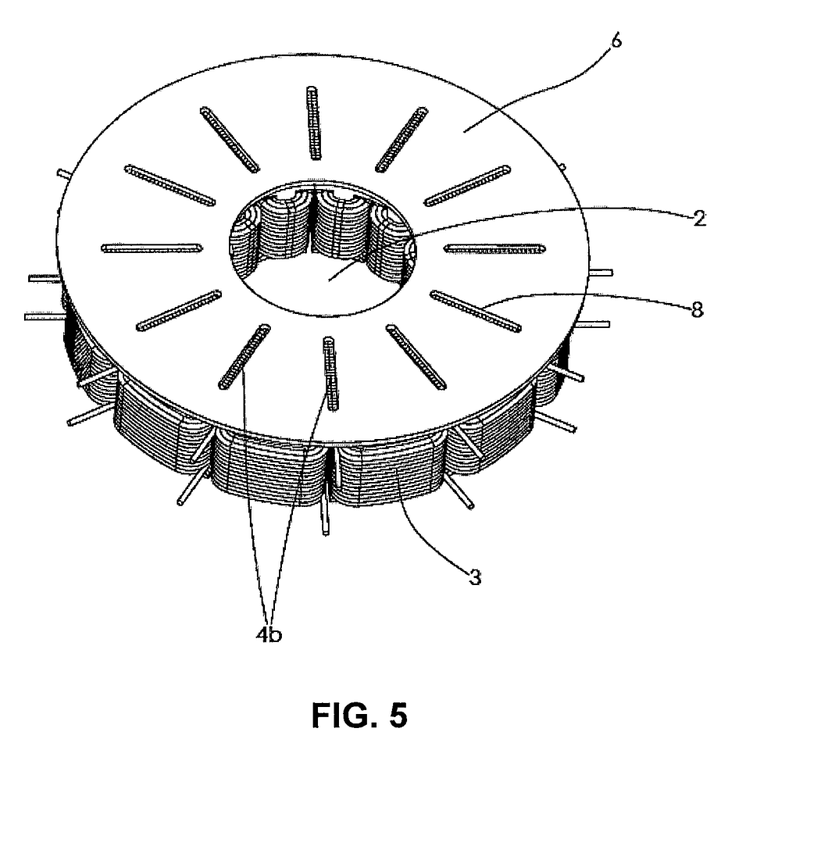

As shown in FIG. 5, the passages 8 can be in the form of holes radial to the ring 1 and positioned by being aligned with a respective notch 13 between windings 3 of adjacent unit portions 4, in this figure above each notch 13, this at least during the welding operation. Note that this can also be valid for a gluing operation.

The notch 13 can be closed, in which case the edges 4b of the adjacent unit portions 4 that partially delimit the notch 13 are directly in contact. The notch 13 can also be semi-closed in which case a space subsists between the edges 4b of the adjacent unit portions 4 delimiting a side of the notch 13, such as is shown in FIG. 4.

The weld spots or beads are advantageously carried out on the edges 4b of the unit portions 4 glued to one another therefore by being aligned with the middle of the respective notch 13 between two adjacent unit portions 4.

Figure 3:
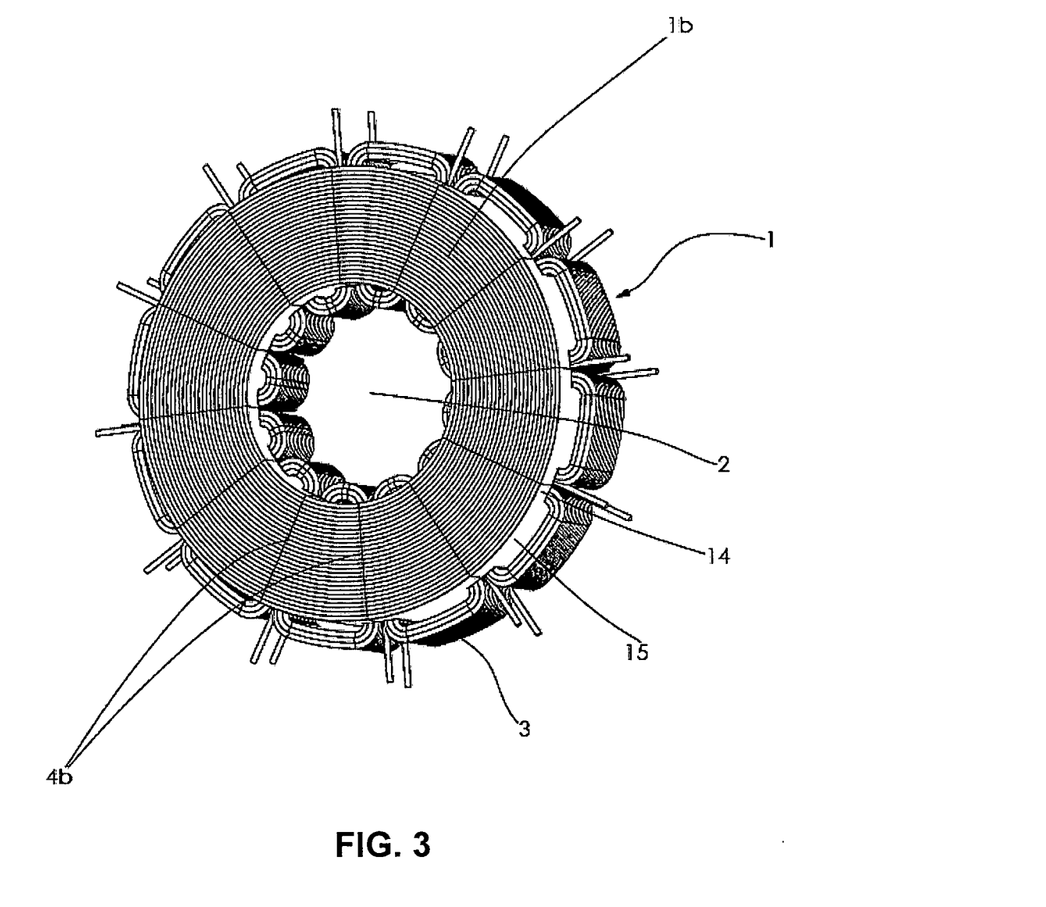
Figure 4:
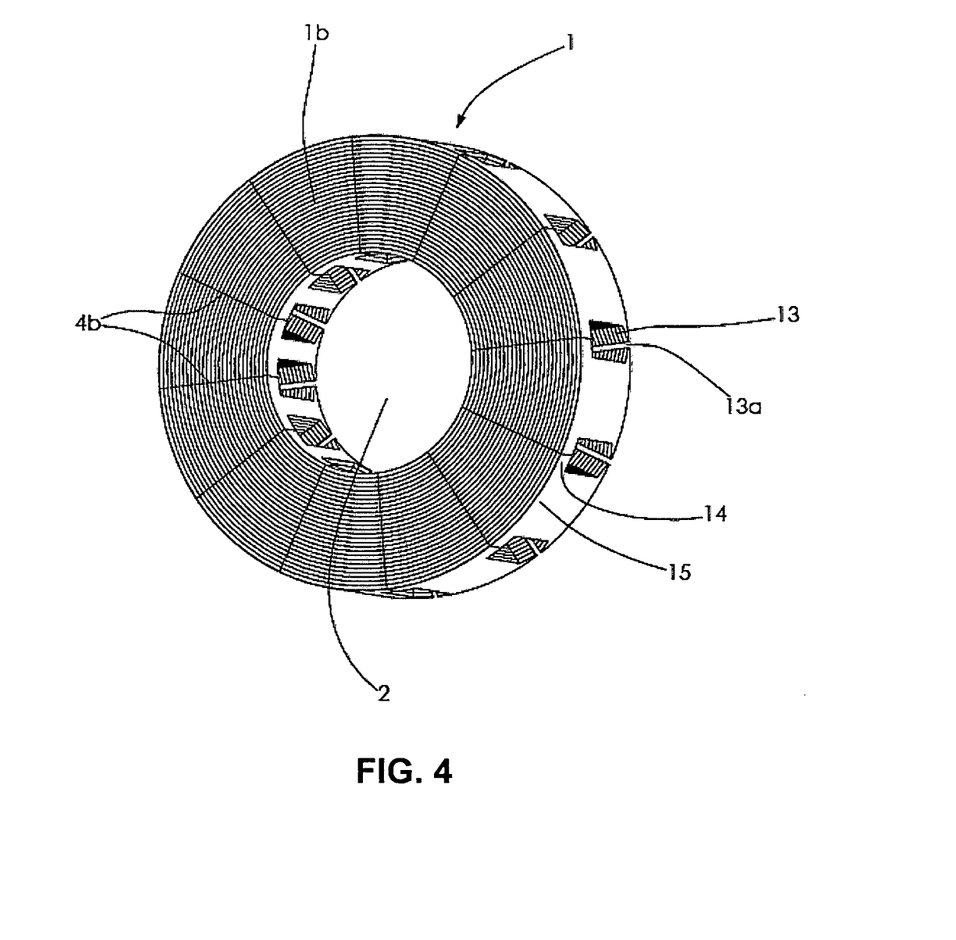

In FIGS. 3 and 4, a support member is not used. The securing by welding or gluing can be done by spots or beads or with a weld bead or gluing on the facing edges 4b applied against one another of the two adjacent unit portions 4. This can be done advantageously on one face 1b of the two substantially circular faces 1a, 1b of the ring 1 or on the two faces 1a, 1b.

In FIG. 5, a support member 6 is used for one of the substantially circular faces. Securing by welding or gluing can be done by weld spots or beads or by gluing on facing edges 4b applied against one another of two adjacent unit portions 4, with the edges 4b being accessible from outside the ring 1 through holes 8 when a support member 6 is provided.

Alternatively, a circular face 1b that does not have a support member of the two substantially circular faces 1a, 1b of the ring 1 can have the abutting edges 4b of two adjacent unit portions 4 welded or glued to one another.

Finally, it is also possible to not use a support member 6. In this case, it is the unit portions 4 which are secured together, either permanently, for example by gluing or welding, or removably via connecting elements, screwing elements or equivalent techniques.

In the embodiment shown in FIGS. 1 and 2, the forms of securing 9 carried by the support member 6 as additional securing means can be insertion pawls 9. Each insertion pawl 9 can have a constant prismatic shape over the length of the pawl.

An apex with a triangular section of the prismatic shape can point to the support member 6 by being fixed on this support member 6. Each one of the other two apexes with a triangular section of the prismatic shape can be housed in a groove 12a of a second respective axially protruding form 12 brought in the vicinity of an edge 4b facing each one of the two adjacent unit portions 4 surrounding the pawl 9.

The first laterally protruding form 14 and the second axially protruding form 12 can surround between them the insertion pawl 9 by limiting the movement thereof.

In the embodiment shown in FIG. 6, the forms of securing 10 carried by the support member 6 can be holes radial to the ring 1 crossing through the support member 6 by forming mortises 10.

Each face of the unit portions 4 facing the support member can then have a tenon 11 as a securing means carried by each unit portion 4. Each tenon 11 penetrates into a respective mortise 10 in the mounted position of the adjacent unit portions 4 on the ring 1. It is possible that as a complement, each tenon 11 and the associated mortise 10 are welded together.

The tenon 11 can occupy only a minor portion of the upper or lower face of each unit portion 4. This has the major advantage of releasing space, with the edges of the mortise 10 being directly above or below each unit portion 4 and not shifted laterally above or below, as would be the case if it was the entire upper or lower face of the unit portion 4 that penetrated into the mortise, as shown in the closest prior art.

More mortises 10 than tenons 11 can be provided in order to offer a freedom of adaptation for a different number of unit portions 4, for example a combination of unit portions 4 of different dimensions, with the tenons 11 of unit portions 4 with different dimensions remaining unchanged in order to adapt to the same mortises 10.

For these two embodiments, it is possible to secure the unit portions 4 together on the circular face 1a, 1b opposite that carrying forms of securing 9, 10. It is even possible to provide a support member 6 for this opposite circular face 1a, 1b. This is not shown in FIGS. 1, 2 and 6.

Keep in mind that all of the embodiments detailed hereinabove can be combined with one another, two support members, a single support member 6 or no support member 6 can be used.

In certain embodiments, when a cylinder ring 15 is present on the edge of the ring 1, an outer ring 7 can surround the cylinder head 15 of the ring 1 over its entire periphery, which allows for an auxiliary radial maintaining of the unit portions 4 secured to the ring 1 according to the various embodiments.

This invention also relates to an electromagnetic machine having at least one stator having a series of windings 3 and at least one rotor carrying at least one magnet, characterised in that said at least one stator is a stator such as described hereinabove.

The term axial flux electric machine means any sort of engines, generators or electromagnetic actuators with an axial flux. This machine can be mono-air gap as well as poly-air gap by having one or several stators and one or several rotors can be superimposed in relation to one another by being separated by at least one air gap on the same shaft. In a poly-air gap electric machine, it is preferred to not use a support member such as the two substantially circular opposite faces 1a and 1b are located on the side of a respective air gap.

For the same ring 1, the unit portions 4 can be of variable shapes and dimensions, for example twice as large or have different profiles.

In a method of manufacturing such a stator and an electromagnetic machine, the coiling of a winding 3 is carried out on a core 5 forming a unit portion 4 dissociated from the other unit portions 4. This can be done separately for each unit portion 4 then dissociated from the other unit portions 4.

This can be carried out at a station other than the mounting station of the stator and not necessarily directly before the mounting of the stator. The unit portions 4 assembled unitarily as such can be retained as is and for example be stored while waiting to be mounted in order to form the ring 1 of the stator.

The securing is then carried out of the unit portions 4 together and/or at least to one support member 6 in order to form the ring 1 of the stator.

The solutions that this invention proposes are well suited for the carrying out of a stator with semi-closed cores or teeth and can be applied in the case of open notches. The cores can be of a variable dimension.

The invention is not in any way limited to the embodiments described and shown which were given only by way of examples.

The invention claimed is:

1. A Stator intended for an axial flux electromagnetic machine, with the stator forming a ring (1) having two substantially circular opposite faces (1a, 1b),
   with the stator being comprised of several unit portions (4) defining the two substantially circular opposite faces (1a, 1b), each unit portion (4) having a core (5) around which is wound the winding (3), the unit portions (4) forming at least partially the ring (1) being arranged concentrically with respect to one another, wherein:
   the unit portions (4) continuously define the two substantially circular opposite faces (1a, 1b) by being arranged concentrically edge to edge with respect to one another and
   have securing means (12, 12a, 14) with a support member (6), carried by axial and lateral faces of each unit portion (4) edge to edge with an adjacent unit portion, and wherein
   between two cores (5) of adjacent unit portions (4) subsists a free space forming a notch (13) and, where applicable, an isthmus (13a) formed by the edges (4a) located on the side intended to form an air gap on a first circular face (1a) of the ring (1), the edges (4b) of each unit portion (4) of a second face (1b) of the ring (1) opposite the first circular face (1a), a first laterally protruding form (14) being between the edges (4a, 4b) of the first and second faces of each lateral side of a unit portion (4), with the adjacent unit portions (4) being arranged edge to edge at least by their first laterally protruding shapes (14).

2. The stator of claim 1, wherein the securing means (12, 12a, 14) are removable or permanent, with the removable securing means (12, 12a, 14) being carried out by screwing or snap-fitting elements between the adjacent unit portions (4) and the permanent securing means being carried out by welding, gluing, or by elements of the rivet type.

3. The stator of claim 2, wherein the removable securing means carried out by screwing, connection or snap-fitting elements are active on the edges (4b) of the adjacent unit portions (4) of the second face (1b) facing and arranged end-to-end.

4. The stator of claim 2, wherein the permanent securing means are carried out by welding, gluing or riveting of the edges facing the adjacent unit portions (4) of the second face (1b) and the support member (6).

5. The stator of claim 1, wherein the support member (6) has holes (8) radial to the ring (1) and positioned by extending parallel to the edges (4b) of the adjacent unit portions (4).

6. The stator of claim 5, wherein the support member (6) has complementary forms of securing (9) associated with forms (12, 12a, 14) of the adjacent unit portions (4) carrying out the securing means carried by each unit portion (4).

7. The stator of claim 6, wherein the forms of securing carried by the support member (6) are insertion pawls (9), each insertion pawl (9) having a constant or variable prismatic shape over the length of the pawl, an apex of a triangular section of the prismatic shape pointing to the support member (6) and each one of the two other apexes with a triangular section of the prismatic shape being housed in a groove (12a) of a respective second axial protruding shape (12) carried by an edge facing each one of the two adjacent unit portions (4), with the first lateral protruding shape (14) and the second axial protruding shape (12) surrounding between them the insertion pawl (9).

8. The stator of claim 1, wherein each unit portion (4) has an assembly of cores placed against one another radially to the ring (1).

9. The stator of claim 1, wherein the support member (6) is an integral part of the casing or is an added part secured to the casing.

10. The stator of claim 1, wherein, when a cylinder ring (15) forming the edge of the ring (1) is present, an outer ring (7) surrounds the cylinder head (15) of the ring (1) over its entire periphery.

11. The stator of claim 1, in which the cores (5) of the unit portions (4) are carried out with magnetic cores, sintered magnetic materials or any other magnetic or antimagnetic material.

12. The stator of claim 1, wherein the unit portions (4) have variable shapes and dimensions for the same ring (1).

13. An electromagnetic machine having at least one stator having a series of windings (3) and at least one rotor carrying at least one magnet, characterised in that said at least one stator is a stator according to claim 1.

14. A Stator intended for an axial flux electromagnetic machine, with the stator forming a ring (1) having two substantially circular opposite faces (1a, 1b),
   with the stator being comprised of several unit portions (4) defining the two substantially circular opposite faces (1a, 1b), each unit portion (4) having a core (5) around which is wound the winding (3), the unit portions (4) forming at least partially the ring (1) being arranged concentrically with respect to one another, characterised in that:
   the unit portions (4) continuously define the two substantially circular opposite faces (1a, 1b) by being arranged concentrically edge to edge with respect to one another and
   have means of securing (11) with a support member (6) carried by at least one upper or lower face of each unit portion;
   wherein the support member (6) has complementary forms of securing (10) associated with forms (11) of the adjacent unit portions (4) carrying out the means of securing carried by each unit portion (4); and
   wherein the forms of securing carried by the support member (6) are holes radial to the ring (1) passing through the support member (6) by forming mortises (10), facing the support member (6) of the adjacent unit portions (4) having a tenon (11) penetrating into a respective mortise (10) in the mounted position of the adjacent unit portions (4) on the ring, with the tenon (11) occupying only a minor portion of the upper or lower face of each unit portion (4).

15. The stator of claim 14, wherein each tenon (11) and the associated mortise (10) are welded together.

\* \* \* \* \*